Dec. 19, 1944.  A. B. WHITE  2,365,610
CONTROL APPARATUS
Filed June 24, 1941  2 Sheets-Sheet 1
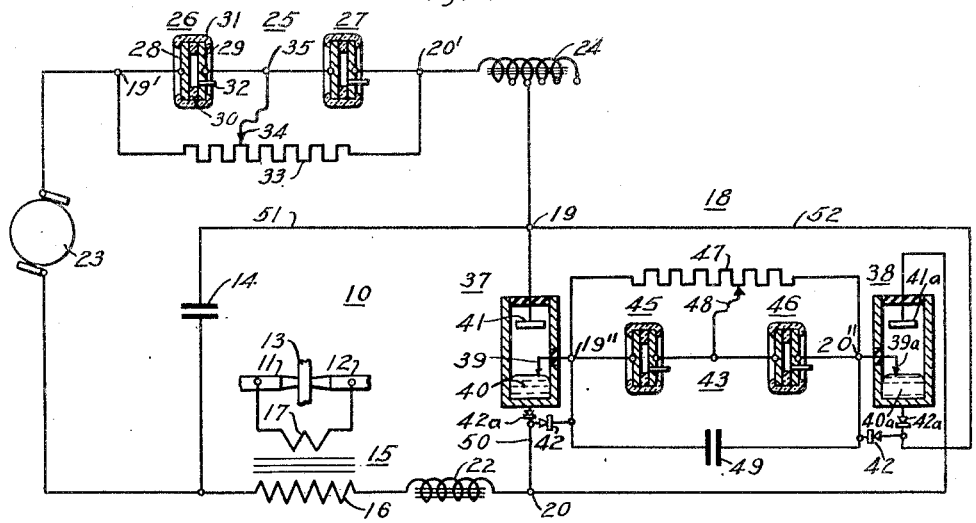
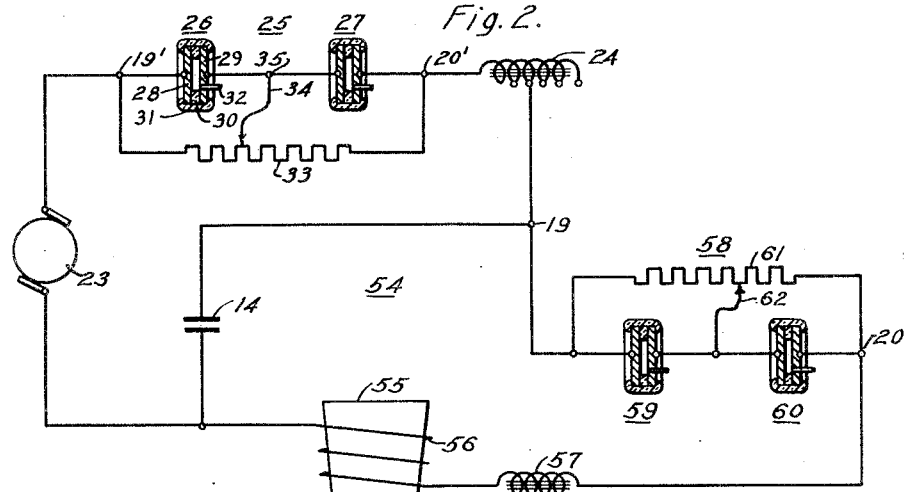
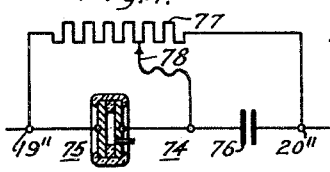
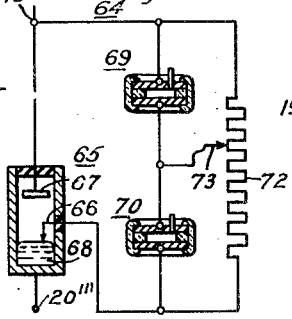
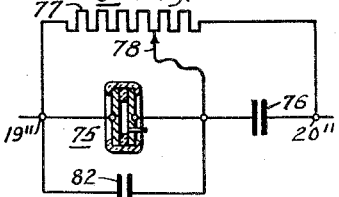
WITNESSES:
INVENTOR
Alfred B. White.
BY
ATTORNEY Dec. 19, 1944.   A. B. WHITE   2,365,610
CONTROL APPARATUS
Filed June 24, 1941   2 Sheets-Sheet 2
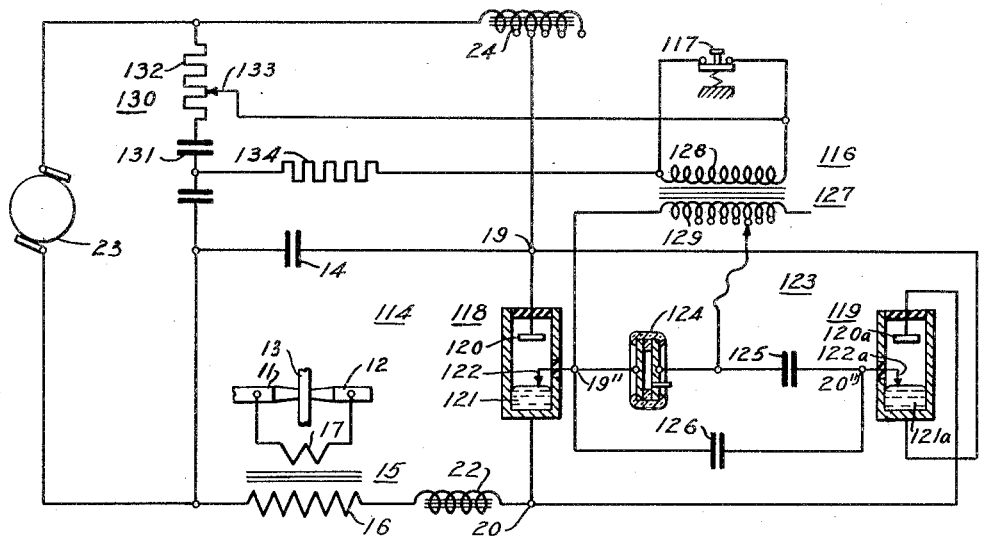
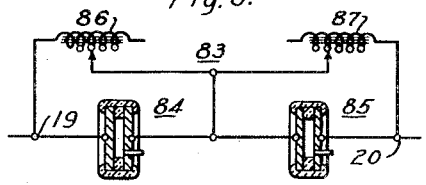
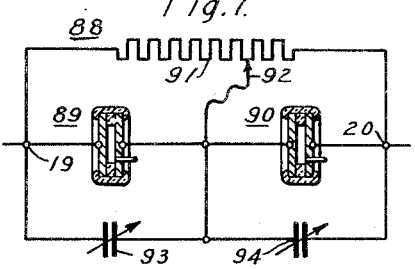
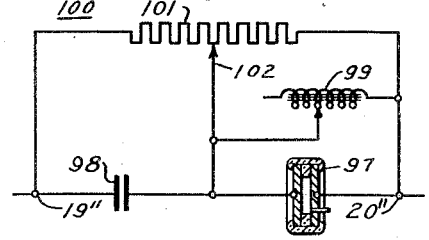
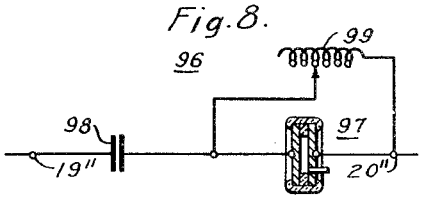
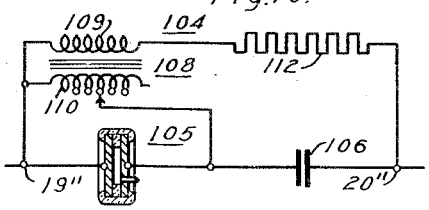
WITNESSES:
N. F. Susser.
F. V. Giolma
INVENTOR
Alfred B. White.
BY
M. Crawford
ATTORNEY Patented Dec. 19, 1944

2,365,610

UNITED STATES PATENT OFFICE 2,365,610

CONTROL APPARATUS

Alfred B. White, Wilkinsburg, Pa., assignor to Westinghouse Electric & Manufacturing Company, East Pittsburgh, Pa., a corporation of Pennsylvania Application June 24, 1941, Serial No. 399,465

18 Claims. (Cl. 250—27)

My invention relates, generally, to control apparatus, and it has reference in particular to switching systems utilizing relatively low pressure gap devices as switches in power and control systems.

Generally stated it is an object of my invention to provide for controlling the flow of current in electrical circuits in a simple and effective manner by utilizing relatively low pressure gap devices as switches.

More specifically, it is an object of my invention to provide for controlling the operation of relatively low pressure gap devices having fixed electrodes disposed in spaced relation in a relatively low pressure gaseous medium, so as to control the breakdown of the devices in response to predetermined voltage conditions in a circuit to be controlled.

Another object of my invention is to provide for varying the voltage applied to a voltage responsive gap device so as to effect a breakdown of the gap for different values of voltage in an associated circuit.

A further object of the invention is to provide for varying the time phase relation of a voltage applied to a gap type switch relative to the voltage of the circuit in which it operates so as to effect breakdown of the gap for different instantaneous values of the circuit voltage.

An important object of the invention is to provide for controlling the connections of an energy storing device to a relatively low frequency source of alternating current energy for charging, and to a load circuit for effecting a relatively high frequency discharge therein.

It is also an important object of the invention to provide for applying a voltage to a voltage responsive gap type switch in excess of the voltage of the circuit in which the switch is connected.

Still another object of the invention is to provide for controlling the voltages applied to a voltage responsive gap type switch so as to effect a breakdown thereof at different values of circuit voltage at different frequencies.

Other objects will in part be obvious, and will in part appear hereinafter.

In accordance with my invention, a simple and efficient switching system may be provided for controlling the flow of power in alternating current systems by connecting in series circuit relation with terminal points in a circuit between which the flow of current is to be controlled a voltage responsive gap device having electrodes so spaced in a gaseous medium under predetermined pressure conditions that the breakdown voltage thereof is approximately 400 volts. The voltage applied to the gap device may be varied in value relative to the voltage between the said points, so as to control the breakdown of the gap device relative to the voltage between the said points. Breakdown thereof at different points in the voltage wave may thereby be secured. Upon breakdown of the gap device a conductive path is established between the said points capable of conducting relatively heavy currents. The flow of current may be interrupted when the instantaneous value of the gap voltage reaches a predetermined minimum value and the gap device remains non-conductive until the voltage applied thereto attains the predetermined value in the next half-cycle of the wave necessary to effect a subsequent breakdown thereof.

For a more complete understanding of the nature and scope of my invention, reference may be had to the following detailed description, which may be read in connection with the accompanying drawings in which:

Figure 1 illustrates diagrammatically a welding system embodying the principal features of the invention;

Fig. 2 illustrates diagrammatically an induction heating system utilizing the invention in a modified form;

Figs. 3 through 10 illustrate diagrammatically switching systems embodying different modifications of the invention; and Fig. 11 illustrates diagrammatically a condenser welding system embodying other modifications of the invention.

Referring to Fig. 1, the reference numeral 10 may denote generally a welding system wherein a pair of welding electrodes 11 and 12 for engaging work 13 may be energized from a suitable source of energy such as the condenser 14, by means of a welding transformer 15 having a primary winding 16 connected to the condenser and a secondary winding 17 connected to the electrodes. Switching means, such as the system indicated generally by the numeral 18 may be connected between the terminal points 19 and 20 in series circuit relation with the condenser 14 and the primary winding 16 of the transformer 15 to control the connection of the primary winding to the condenser.

A reactance device 22 may be connected in series circuit relation with the primary winding 16 of the welding transformer and the condenser 14 to provide the condenser with a discharge circuit having a relatively high natural frequency, in order to secure a relatively high frequency discharge of the condenser through the primary winding 16.

The condenser 14 may be charged from a suitable source of electrical energy such as the generator 23. With a view to controlling the current supplied by the generator 23, so as to limit the amount of power supplied by the generator 23 directly to the primary winding 16 of the welding transformer 15 when it is connected to the condenser by the switching system 18, suitable current limiting means may be provided, such as, for example, the reactance device 24, which may be connected in series circuit relation with the generator 23 and the condenser 14.

In order to control the connection of the condenser 14 to the source or generator 23, switching means denoted generally by the reference numeral 25 may be connected between points 19' and 20' in series circuit relation with the condenser 14 and the generator 23. The switching means may, for example, comprise a pair of voltage responsive gap devices 26 and 27 of a construction such as is described in detail in the copending application, Serial No. 358,634, of Joseph Slepian and William E. Berkey, filed September 27, 1940, and assigned to the Westinghouse Electric & Manufacturing Company, the assignee of this application.

Since the gap devices may be similar, only the device 26 will be described in detail. It may, for example, comprise relatively flat electrode members 28 and 29 positioned in spaced relation by means of an annular insulating spacer 30 of porcelain, or the like. The electrode members may comprise disks of a metal with which a vitreous bond may be secured, such as, for example, an iron-nickel-cobalt alloy, which may be sealed together by means of a glass bead seal 31. A conduit 32 may be provided in one of the electrode members for exhausting the interior space between the electrode members and if dsired, for introducing a gaseous medium other than air and reducing the pressure of said medium to a predetermined relatively low value.

For example, in one instance the electrode members 28 and 29 may comprise disks of an iron-nickel-cobalt alloy known as Kovar, having electrode surfaces of approximately 25 square centimeters, which may be spaced one millimeter apart. The pressure of the gaseous medium between the electrode members may be reduced to approximately one centimeter of mercury (pressures of from $\frac{1}{5}$ of a centimeter to 10 or 15 centimeters also give satisfactory results).

Under these conditions the impulse breakdown voltage is approximately 350 volts while the 60-cycle alternating current breakdown voltage is approximately 300 volts. Currents of approximately 5000 amperes may be conducted between the electrodes for periods of approximately ½ cycle with a temperature rise of only about 50° C. Such gap devices may be operated over relatively long intervals for interrupting relatively high currents without any appreciable change in the characteristics of the gaps.

In order to provide for controlling the charging current of the condenser 14 during the charging period, suitable means may be provided for controlling the breakdown of the gap devices 26 and 27 so as to render the gap devices conductive at different points in the alternating current wave and vary the charge of the condenser. For example, by connecting a voltage divider resistance 33 across the gap devices 26 and 27 with an adjustable contact 34 connected to a point 35 intermediate the gap devices, the value relation between the voltages applied to the gap devices 26 and 27 may be varied by moving the contact 34. A greater voltage may thereby be applied to the gap device 27 than to the gap device 26 so that the gap device 26 breaks down at a predetermined voltage, before the gap device 26. The full voltage of the source 23 is then applied across the gap device 26, breaking it down and connecting the condenser 14 to the source 23 for charging. By controlling the voltages applied to the gap devices and varying the point in the current wave at which the gap devices 26 and 27 break down and are rendered conductive, the duration of the charging period and hence the charge of the condenser 14 may be controlled so as to effect control of the energy in the charge and thus the welding heat.

In order to disconnect the primary winding 16 from the condenser 14 during the charging period, the switch means 18 should be normally non-conductive, and may be rendered conductive in response to predetermined voltage conditions of the condenser 14, which varies in accordance with the charge thereof. For example, electrode controlled arc discharge devices 37 and 38 having control electrodes 39 and 39a, mercury pool cathodes 40 and 40a and anodes 41 and 41a, respectively, may be connected in inverse relation between the terminal points 19 and 20. Rectifier devices 42 may be connected between the cathodes and control electrodes of the arc-discharge devices to provide a bypass and blocking means such as the rectifier devices 42a may be used to protect the control electrodes against back voltages.

With a view to energizing the control electrodes 39 and 39a suitable control means may be provided, such as the switching system 43, which responds to predetermined voltage conditions of the condenser 14. The switching system 43 may comprise voltage response gap devices 45 and 46 of substantially the same type as the gap devices 26 and 27, connected in series circuit relation with the terminal points 19" and 20" between the control electrodes 39 and 39a. Means may be provided for varying the voltages applied to the gap devices 45 and 46, such as, for example, the voltage divider resistance 47 having an adjustable contact 48 connected intermediate the gap devices 45 and 46. The voltage applied to the gaps may thereby be varied to effect breakdown of the gap devices 45 and 46 in any predetermined order and at any predetermined gap voltage to energize the control electrodes 39 and 39a when the voltage of the condenser 14 reaches a predetermined instantaneous value.

Because of the relatively high natural frequency of the discharge circuit of the condenser 14, the discharge thereof tends to be oscillative in nature, charging and discharging in opposite directions during the remaining portion of the first half of the charging cycle. Means may be provided for by-passing the gap devices 45 and 46, if desired, to control the subsequent energization of the control electrodes 39 and 39a in response to the relatively high frequency oscillating discharges of the condenser 14 subsequent to the initial connection of the condenser to the welding transformer 15, or they may be adjusted to break down only so long as the voltage of the oscillating discharges reaches the predetermined value at which they initially broke down. For example, a condenser 49 may be connected between the control electrodes 39 and 39a to provide a relatively low impedance path for effecting energization of the control electrodes in response to the relatively high frequency oscillating current flowing between the condenser 14 and the primary winding 16 of the welding transformer, so as to continue the oscillations after the discharge circuit voltage falls below the initial breakdown voltage.

In the operation of the welding system shown in Fig. 1, the gap device 27 breaks down prior to the gap device 26, when the instantaneous value of the gap voltage reaches a predetermined value in any given half-cycle of the source voltage, since a greater proportion of the voltage impressed upon the gap devices is impressed across the gap device 27. The contact 34 may be adjusted to vary the voltage applied to the gap devices, and thus effect their breakdown at different points in the voltage cycle.

As soon as the gap device 27 breaks down and becomes conductive, the full voltage of the source 23 is impressed across the gap device 26, causing it to break down and conduct. The gap devices both conduct for the remaining portion of the half-cycle, charging the condenser 14. When the instantaneous voltage across the gaps is reduced to a value insufficient to sustain the arc discharge the gap devices cease to conduct until the voltage in the succeeding half-cycle reaches a sufficient high value to cause the gap 27 to break down again, whereupon the charging occurs in the opposite direction.

During the first part of the first half-cycle when the condenser 14 is charging, the primary winding 16 of the transformer 15 is disconnected from the condenser 14, since the voltage of the condenser is insufficient to cause the gap devices 45 and 46 to break down and render the electrode-controlled arc discharge devices 37 and 38 conductive. As soon as the charge of the condenser 14 reaches a predetermined value suitable for welding, the voltage which is impressed across the gap devices 45 and 46 from the condenser 14 through the circuit extending from one terminal of the condenser through the primary winding 16, reactance device 22, terminal point 20, conductor 50, cathode 40, control electrode 39 to terminal point 19'', and from the other terminal of the condenser through conductor 51, terminal point 19, conductor 52, cathode 40a, and control electrode 39a to the terminal point 20'', becomes sufficient to cause the gap devices 45 and 46 to break down. The voltage existing between the terminal points 19 and 20 is impressed on the control electrodes 39 and 39a causing the arc discharge device 37 or 38 having an instantaneous positive voltage on the anode to become conductive.

The condenser 14 is thus connected to the primary winding 16 of the welding transformer so that the condenser discharges therethrough, and an extremely large welding current flows between the electrodes 11 and 12. Since the discharge circuit of the condenser 14 has a relatively high natural frequency, the discharge of the condenser 14 will be effected at a relatively high frequency and will be oscillative in character. That is, as soon as the condenser 14 discharges in one direction, as described, it will recharge and discharge in the opposite direction, the control electrode of the other arc discharging device being energized by the flow of the relatively high frequency current from one terminal of the condenser to the other terminal thereof through the auxiliary condenser 49. A high frequency welding current is thereby induced in the secondary winding of the transformer 15.

The oscillating discharge of the condenser may continue during the second half of the first half-cycle of the source or condenser charging frequency until the high frequency oscillations are reduced to such a value that the instantaneous gap voltage is insufficient to effect breakdown of the gap devices 45 and 46, or until the high frequency energizing current through the auxiliary condenser 49 is insufficient to render one or the other of the arc discharge devices 37 and 38 conductive. The primary winding 16 is thereby disconnected from the condenser 14, which may thereupon be reconnected to the source 23 for recharging in the second half-cycle of the source frequency.

Referring to Fig. 2, the reference numeral 54 may denote generally an induction heating system embodying the invention, wherein a cupola 55 is provided with an induction heating coil 56 disposed to be connected to the condenser 14 for effecting a relatively high frequency discharge therefrom. An auxiliary inductance 57 may be connected in series circuit relation with the inductance coil 56 to provide a relatively high predetermined natural frequency in the discharge circuit of the condenser 14.

The condenser 14 may, as in the system of Fig. 1, be connected to a suitable source of electrical energy such as the generator 23 by a switching system 25, similar to that described in connection with Fig. 1, and provided with a reactance 24 for limiting the flow of current from the source 23, through the discharge circuit during the discharge period.

Instead of utilizing a switching system such as that described in connection with Fig. 1 for controlling the connection of the condenser 14 to the welding transformer 15, a switching system 58, comprising gap devices 59 and 60 of the type used to control the connection of the condenser to the source 23, may also be connected between the terminal points 19 and 20 to control the connection of the condenser 14 to the induction heating coil 56. Control means may be provided to control the voltage applied to the gap devices. For example, a voltage divider resistance 61 having a movable contact 62 may be utilized to apply a greater voltage to the gap device 59 than to the gap device 60, so as to control the breakdown of the gap devices at a predetermined value of voltage between the terminal points 19 and 20.

The energization of the condenser 14 from the source 23 in the induction heating system of Fig. 2 may be effected in a similar manner to that described in connection with the energization of condenser 14 from the generator 23 in the welding system of Fig. 1. When the voltage applied to the gap devices 59 and 60 by the condenser 14 reaches a predetermined value, the gap device 59 breaks down, impressing the full condenser voltage on the gap device 60, so that it also breaks down and connects the condenser to the inductoin winding 56 and auxiliary reactance 57, so as to effect a relatively high frequency oscillating discharge therethrough.

The gap devices 59 and 60 conduct in both directions alternately during the remainder of the half-cycle of the source or condenser charging frequency so long as the high frequency voltage applied thereto from the condenser 14 is above the predetermined minimum value for which they are calibrated to break down. Thus an oscillating discharge of condenser 14 may be effected during the second portion of the first half-cycle of the source or condenser charging frequency until the voltage applied to the gap devices by the condenser 14 reaches the predetermined minimum value. On the subsequent half-cycle the condenser 14 is charged from the source 23 in the opposite sense. When the voltage applied to the gap devices by the condenser 14 reaches the predetermined value, the gap devices 59 and 60 break down, and another series high frequency oscillating discharges of the condenser 14 through the induction winding 56 may be effected.

Referring to Fig. 3, the reference numeral 64 may denote generally a modified switching system which may be used where it is desired to conduct in one direction only. In this modification of the invention a single electrode-controlled arc discharge device 65 having control electrode 66, anode 67, and cathode 68, may be connected between terminal points 19''' and 20''' between which the flow of current is to be controlled. A pair of gap devices 69 and 70 may be connected in series circuit relation between the control electrode 66 and the anode 67. Suitable means may be provided for varying the division of voltage across the gap devices 69 and 70, such as, for example, the control resistor 72 having an adjustable contact 73 which may be connected to a point intermediate the gap devices. By adjusting the contact 73 the breakdown of the gap devices may be varied for a given voltage between the terminal points 19''' and 20''' so that the control electrode 66 may be energized at different points in the voltage cycle. Such a switching system may be used where non-oscillatory or unidirectional currents are desired, since it conducts in one direction only.

Referring to Fig. 4, the numeral 74 may denote a further modification of the switching system which may be used to advantage with electrode controlled arc discharge devices, and which may, for example, be connected between the terminal points 19'', 20'' of Fig. 1 for controlling the control electrode current. A gap device 75 may be connected in series circuit relation with a suitable impedance such as, for example, the condenser 76 which is capable of carrying the current to be conducted between the terminal points 19'' and 20''. The voltage across the gap device 75 may be varied so as to effect breakdown thereof for different values of voltage between the terminal points 19'' and 20'' by means such as the voltage dividing resistor 77, which may be connected in shunt relation with the gap device 75 and condenser 76, and provided with a movable contact 78 connected intermediate a gap device 75 and the condenser 76. When the voltage across the gap device 75 reaches the breakdown value, the gap device conducts and current flows between the terminal points 19'' and 20'' through the gap device and the condenser 76. If the resistance 77 is of a relatively low value relative to the capacity of the condenser 76, no phase shift will result, but if it is relatively large, phase shift may be secured by the condenser effect.

Referring to Fig. 5, the reference number 80 denotes generally a switching system for controlling the flow of current between the terminal points 19'' and 20''. The switching system 80 may be substantially identical with the switching system of Fig. 4 except for the addition of an auxiliary condenser 82, which may be provided to by-pass the gap device 75 and provide a relatively low impedance path for a relatively high frequency current.

When such a switching system is used, for example, with electrode-controlled arc discharge devices as in Fig. 1, to control the connection of an energy storing device to a load circuit having a relatively high natural frequency, the gap device 75 may control the initial energization of the control electrodes, while the auxiliary condenser 82 may provide sufficiently high oscillating current impulses to the control electrodes after the initial discharge of the main condenser to sustain a relatively high frequency oscillation in the load circuit.

Referring to Fig. 6, the reference numeral 83 may denote generally a further modification of the switching system for controlling the flow of current between terminal points such as the terminal points 19 and 20 of Fig. 1 or 2. Gap devices 84 and 85 of the type hereinbefore described may be connected in series circuit relation between the terminal points 19 and 20. In order to vary the voltages across the gap devices 84 and 85 relative to each other and to the voltage existing between the terminal points 19 and 20, adjustable reactances 86 and 87 may be provided to function in a similar manner to the potentiometer or voltage divider of switching systems 25, 43 and 58, etc., as hereinbefore described.

In Fig. 7 the reference numeral 88 may denote generally still another form of switching system for controlling the flow of current between terminal points such as the terminal points 19 and 20 of Fig. 1 or 2. Gap devices 89 and 90 may be connected as hereinbefore described in connection with the switching systems 25 and 58, and the series connected gap devices 89 and 90 may be provided with suitable voltage controlling means such as the potentiometer or voltage divider 91 having a movable contact member 92 connected intermediate the flap devices.

In order to provide for rendering the gap devices 89 and 90 conductive under different voltage conditions at a relatively high frequency than at a normally relatively low frequency, suitable means such as the variable condensers 93 and 94 may be provided. If desired the condensers may be used without the voltage divider 91, in place of the inductive reactances 86 and 97 of Fig. 6. Since the condensers 93 and 94 afford a low impedance path to relatively high frequency currents, the voltage drops across the condensers 93 and 94 will determine the voltages across the gap devices 89 and 90 at the higher frequencies. The condensers 93 and 94 may therefore be so adjusted as to ratio the voltages across the gap devices 89 and 90 differently and control the breakdown thereof at higher frequencies, than at the lower frequency, where the voltage divider or potentiometer device 91 predominates and determines the breakdown of the gap devices.

Referring to Fig. 8, the reference numeral 96 may denote generally still another modification of the invention which is well adapted to controlling electrode-controlled arc discharge devices, and which utilizes series resonant conditions for applying a control voltage to the gap device 97 greater than the voltage existing between the terminal points 19'' and 20''. For example, a capacitor reactance 98 and an inductive reactance 99 may be connected in series circuit relation between the terminal points 19'' and 20''. By making the reactances 98 and 99 substantially equal at a predetermined frequency, a series resonant condition may be produced at that frequency such that the voltages across each of the reactances are in excess of the voltage impressed between the terminal points 19" and 20". By connecting the gap device 97 in shunt relation with one or the other of the reactances, a control voltage may be applied thereto in excess of the voltage between the terminal points 19" and 20". The gap device 97 may thus be caused to break down and become conductive for circuit voltages between the terminal points 19" and 20" less than the actual voltage required to break down the gap device. The switching system may thus be made conductive at different points in the voltage wave by adjusting the reactances to vary the transient voltage applied to the gap device 97.

Referring to Fig. 9, the reference numeral 100 may denote generally a switching system embodying a modification of the switching system of Fig. 8. In addition to utilizing the capacitive and inductive reactances 98 and 99 to produce the series resonant condition at a predetermined frequency, it may be desirable to utilize other control means for controlling the breakdown of the gap devices at another frequency. For example, voltage ratioing means such as the voltage divider 101 may be provided, having a movable contact member 102 connected intermediate the condenser 98 and the gap device 97. By utilizing the voltage divider 101, together with the capacitive and inductive reactances, the voltage divider may be utilized to ratio the voltage applied to the gap device 97 under circuit conditions at one frequency so as to control its breakdown, while the capacitive and inductive reactances will predominate in the control of the breakdown at another frequency. Breakdown of the gap device may thus be effected at different circuit voltages at different frequencies. Such a switching system would be particularly suited for use in the systems of Figs. 1 and 2 where the initial breakdown is effected at a relatively low frequency and subsequent breakdowns during the remaining portion of the particular half-cycle are affected at a relatively high frequency.

Referring to Fig. 10, the reference numeral 104 may denote generally a switching system of still another form for controlling the flow of current between terminal points such as, for example, the terminal points 19" and 20" of Fig. 1. As illustrated, means such as the gap device 105 may be connected in series circuit relation with a suitable reactance device such as the condenser 106 between the terminal points 19" and 20". A transformer 108 may be provided having a primary winding 109 which may be connected to a suitable source of control voltage, being, for example, connected between the terminal points 19" and 20", and a secondary winding 110 connected across the gap device 105 so as to apply a relatively high control voltage thereto. The secondary winding 110 is preferably so connected that the voltage across the gap device 105 is in opposition to the voltage across the condenser 106. The condenser 106 should be of such capacity that it provides sufficient impedance at the charging frequency of the condenser 14 to limit the current through the secondary winding 110 and condenser 106 below that necessary to render the devices controlled (for example, the electrode-controlled arc discharge devices 37 and 38 of Fig. 1) operative. Since the wave front of the current impulse or breakdown of the gap device 105 is relatively steep and in effect high frequency, the condenser 106 will pass a much higher current upon breakdown of the gap device, so as to render the devices controlled operative. A control resistor 112 may be connected in series circuit relation with the primary winding 109 to limit the current flow therethrough and prevent surges. By magnifying the voltage applied to the gap device 105, breakdown of the gap device to connect the terminal points 19" and 20" may be effected at voltages far below the actual breakdown voltage of the gap device and the point of breakdown in the voltage wave may be controlled substantially independently of the frequency.

Referring to Fig. 11, the reference numeral 114 may denote generally a welding system wherein a condenser 14 may be connected to a suitable source of electrical energy such as the generator 23 for charging, and is disposed to be connected to the primary winding 16 of a welding transformer 15 by switching means 116 operable under the control of a push button 117 when the voltage of condenser 14 reaches a predetermined value. Means such as the reactance device 24 may be provided to limit the flow of electrical energy from the source directly to the transformer 15. An auxiliary reactance 22 may be utilized to provide the discharge circuit of the condenser 14 with a predetermined natural frequency so as to effect an oscillating discharge of the condenser 14 therein.

The switching means 116 may, for example, comprise electrode controlled arc discharge devices 118 and 119 connected in inverse relation between the terminal points 19 and 20 and having anodes 120, 120a, cathodes 121, 121a and control electrodes 122 and 122a, respectively. In order to control the energization of the control electrodes 122 and 122a, means such as the switching system 123 may be utilized between the terminal points 19" and 20". The switching system may, for example, comprise a gap device 124 connected in series circuit relation with a condenser 125 between the terminal points 19" and 20" or the control electrodes, 122 and 122a. An auxiliary condenser 126 may be provided for by-passing the gap device to provide a relatively low impedance path between the control electrodes for a relatively high frequency discharge current from condenser 14.

In order to provide for controlling the breakdown of the gap device 124, suitable means may be utilized for controlling the voltage applied thereto. For example, a control transformer 127 may be provided, having a secondary winding 129 connected across the gap device 124, and a primary winding 128, which may be energized from a suitable source, such as the source 23. The gap device 124 may be designed not to break down at the maximum voltage of the condenser 14, so that an increased voltage from the control transformer 127 is necessary to effect breakdown.

Suitable phase adjusting means 130, such as the condenser 131 and resistance 132 having a movable contact member 133 may be provided for varying the phase of the control voltage applied to the gap device 124 relative to the source voltage. With a view to controlling the application of the control voltage to the gap device 124, the push-button switch 117 may be connected in shunt circuit relation with the primary winding 128 so as to render the secondary voltage of the control transformer substantially zero until the push-button switch 117 is operated to the open position. While the switch 117 is closed substantially the entire voltage between the terminal points 19" and 20" appears across the condenser 125. A control resistor 134 may be provided in the primary circuit of the control transformer 127 to limit the control current when the switch 117 is closed.

While the push-button switch 117 remains closed, and voltage across the gap device 124 will be a minimum and insufficient to break it down. When the switch 117 is opened, a relatively high control voltage may be impressed across the gap device by the control transformer 127 to effect its breakdown. By adjusting the contact member 133, the phase of the control voltage may be varied relative to the phase of the voltage of the source 23 and the condenser 14. When the control voltage reaches a predetermined value, the gap device 124 breaks down and the control electrodes 122 and 122a are connected across the condenser 14, through the condenser 125, which passes sufficient current to effect energization of the control electrodes 122 and 122a.

The arc discharge device having a positive instantaneous voltage on the anode becomes conductive and the condenser 14 discharges through the primary winding 16 of the transformer 15, inducing a welding current in the secondary winding 17. Subsequently relatively high frequency discharges of the condenser 14 may be effected in alternately opposite directions during the remainder of the same half-cycle of the source voltage wave as the arc discharge devices are alternately rendered conductive either by breakdown of the gap device 124 if the push-button switch 117 remains open, or by the relatively high frequency current by-passed between the control electrodes by the auxiliary condenser 126. As soon as the voltage impressed on the gap device 124 by the condenser 14 builds up in the opposite direction on the next half-cycle of the source or condenser charging frequency, the discharge sequence may be repeated in the opposite sense.

From the above description and the accompanying drawings, it will be apparent that I have provided in a simple and effective manner for so controlling the breakdown of fixed gap devices of the low pressure type that they may be readily used as switch devices in control and power circuits. Such gap devices are simple and inexpensive to construct and are capable of conducting extremely large currents at repeated intervals over relative long periods of time and are therefore well suited to controlling the flow of current in welding systems where relatively large surges of current are required during relatively short intervals. The different switching systems embodying the invention may be used in the welding, induction heating or other like systems for controlling either heavy load currents or relatively light control currents. The systems having terminal points 19—20 or 19'—20' may be used in either capacity, while those having terminal points 19" and 20" are more adapted to control systems.

Since certain changes may be made in the above description and different embodiments of the invention may be made without departing from the spirit or scope thereof, it is intended that all the matter obtained in the above description or shown in the accompanying drawings shall be considered as illustrative and not in a limiting sense.

I claim as my invention:

1. A switching system for connecting a load to a source comprising, an enclosed bi-directional low pressure voltage responsive arc discharge gap device connected in series with the load and source having a pair of fixed spaced plane electrodes with a predetermined breakdown voltage, an impedance device, circuit means connecting the devices to a variable voltage circuit in series circuit relation, and variable impedance means connected in bridged relation with and having an adjustable connection connected between the devices to prevent breakdown between the electrodes until the voltage of the circuit reaches a predetermined value higher than the predetermined breakdown voltage of the arc discharge device.

2. A switch system for an alternating current circuit including a load device comprising, a pair of non-directional arc discharge gap devices having relatively large area plane electrodes so spaced in a gaseous medium at a pressure less than 10 centimeters of mercury that the predetermined breakdown voltage is substantially a minimum connected in series circuit relation with the load device, and impedance means provided with an adjustable tap connected intermediate the discharge devices connected in shunt relation with the discharge devices to prevent breakdown of th earc discharge devices until a predetermined point in the voltage wave of the source, whereby control of the conducting period of the said devices is effected to predetermine the average load current.

3. The combination with a pair of switch devices of the enclosed low pressure arc discharge gap type connected in a variable voltage load circuit, of an impedance shunt connected across both devices and an adjustable tap therefor connected intermediate the devices to effect breakdown of said devices when the circuit voltage reaches a predetermined value greater than the breakdown voltage of one of said devices and less than the combined breakdown value of both.

4. A control system for an alternating current circuit comprising, a pair of enclosed low pressure bi-directional electric gap arc discharge devices connected in the circuit in series relation, and reactance means connected in bridging relation with the devices adjustable to provide a predetermined ratio between the voltages across the said devices and the circuit voltage, whereby the arc discharge devices may be rendered conductive at predetermined points in the voltage wave applied to the control system.

5. The combination with a pair of series connected low pressure voltage responsive arc discharge gap devices in an alternating current circuit, of an impedance potentiometer connected in bridging relation with the said devices to effect breakdown of the arc discharge devices at predetermined point in successive half cycles of the wave of the voltage applied to the devices at one frequency, and reactance means connected in bridging relation with the said devices to effect a breakdown of the arc discharge devices at a different predetermined voltage at a different frequency.

6. A switching system comprising, a pair of electrode-controlled arc discharge devices connected in inverse relation and provided with control electrodes for controlling the energization of a load circuit from an alternating current source, a bi-directional voltage responsive gap device comprising a pair of electrodes so spaced in a gaseous medium having a pressure less than 15 centimeters of mercury that the breakdown voltage is less than 400 volts connected between the control electrodes for controlling the energization of the control electrodes, and means for varying the voltage between the electrodes of the gap device relative to the voltage applied to the arc discharge devices to effect energization of the control electrodes under predetermined voltage conditions.

7. The combination in a power system, of a load circuit disposed to be energized from an alternating current source of power, an arc discharge gap device of the bi-directional type connected between the load circuit and the source comprising a pair of spaced electrodes separated by a gaseous medium at a pressure less than 10 centimeters of mercury, the relation between the spacing of the electrodes and the pressure of the gaseous medium being such that the breakdown voltage is predetermined and is substantially a minimum, impedance means connected in series relation with the gap device, and means adjustable to limit the instantaneous value of the voltage between the electrodes to a predetermined proportion of the instantaneous value of the circuit voltage to effect a breakdown of the electric discharge device at different predetermined points in the wave of the source voltage, connected in bridging relation with the gap device and the impedance means.

8. The combination in a switching system for connecting a load to a variable voltage source, of a voltage responsive gap device having relatively closely spaced plane electrodes of relatively large area in a gaseous medium at a pressure of less than 10 centimeters of mercury, connected in series with the load and source, a condenser connected in series circuit relation with the discharge device, and voltage dividing means connected in bridged relation with the said discharge device and condenser to vary the voltage distribution therebetween.

9. A switching system for connecting a load device to an alternating current source comprising, an arc discharge gap device having relatively closely spaced electrodes of relatively large area in a gaseous medium at a relatively low pressure, a relatively large capacity energy storage device connected in series circuit relation with the discharge device, potentiometer means for varying the division of voltage between the discharge device and condenser, and a relatively small capacity condenser connected in shunt relation with the discharge device.

10. A switching system comprising, an electrode-controlled arc discharge device having a control electrode for controlling the energization of a load circuit from a variable voltage source, a pair of voltage responsive gap arc discharge devices having spaced electrodes in a relatively low pressure gaseous medium connected in series circuit relation for controlling the energization of the control electrode from the source, and voltage dividing means to predetermine the ratio between the voltages across the said arc discharge gap devices to effect the breakdown thereof at different predetermined values of load circuit voltage greater than the breakdown values of the arc discharge gap devices.

11. The combination in a switching system for connecting a load to an alternating current source, of a relatively low pressure voltage responsive bi-directional gap device connected to control the energization of the load device from the alternating current source, an inductive reactance and a capacitative reactance connected in series circuit relation with the load and the source, said reactances being substantially equal at a predetermined frequency to produce series resonance, and circuit means connecting the gap device in shunt with one of the said reactances so as to apply a control voltage thereto greater than the voltage of the source.

12. A power system comprising, a load circuit adapted to be connected to an alternating current source of one frequency and having a different predetermined natural frequency, inductive and capacitative control reactances connected in series circuit relation with the load circuit and the source, said reactances being tuned to produce series resonance conditions at one of said frequencies so as to apply a voltage to the gap device greater than the voltage applied to the reactances, a relatively low pressure voltage responsive bi-directional gap device connected in shunt relation with the inductive reactance, and means to control the voltage applied to the gap device at the other of said frequencies.

13. The combination in a switching system, of a relatively low pressure voltage responsive bi-directional gap device connected to control the flow of current between two points in an electrical circuit, impedance means connected in series circuit relation with the gap device, and inductance means having a portion shunting the gap device and the impedance means, and a portion in shunt with the gap device for applying thereto a voltage greater than the voltage between the said points of the circuit.

14. Switch means for connecting a load to an alternating current source comprising, a voltage responsive bi-directional gap device connected in series with the load and source, a reactance device connected in series circuit relation with the gap device, and transformer means having one winding connected across the gap device to apply a control voltage thereto having a predetermined relation to a voltage impressed across the gap device and reactance device.

15. A heat control system for a welding circuit energized from an alternating current source comprising, a relatively low pressure voltage responsive bi-directional gap device connected in series circuit relation with the welding system and the source, an impedance device connected in series circuit relation with the gap device, and adjustable control means comprising a voltage divider connected in shunt relation with the gap device and the impedance device and having an adjustable tap connected between the gap device and the impedance device to vary the voltage applied thereto from the source so as to predetermine the instantaneous value of the source voltage in successive half cycles at which the gap device breaks down and becomes conductive.

16. A power system comprising, a condenser disposed to be charged from a source of alternating current, a load circuit disposed to be connected to the condenser under predetermined voltage conditions of the condenser, a relatively low pressure bi-directional voltage responsive gap device connected in series circuit relation with the condenser and load circuit to provide an oscillatory discharge circuit for the condenser, and means associated with the gap device to vary the voltage applied across the gap device relative to the voltage of the source to vary the charging period of the condenser from the source.

17. The combination in a power system comprising, an energy storing device disposed to be charged from a source of electrical energy and a load circuit having a relatively high natural frequency disposed to be connected to the energy storing device for energization under predetermined conditions, of a pair of electrode-controlled arc discharge devices connected in inverse relation in series with the load circuit and the energy storing device, a pair of voltage responsive gap devices connected between the control electrodes to control the energization thereof, and means for varying the voltages applied to the gap devices to control their breakdown relative to the voltage between the control electrodes.

18. A power system comprising, an energy storing device disposed to be connected to an alternating current source of electrical energy for charging, a load circuit having a relatively high natural frequency, switch means including a pair of inversely connected electrode-controlled arc discharge devices connected between the load circuit and the energy storing device, control means including a relatively low pressure voltage responsive gap device connected for controlling the energization of the control electrodes, means for applying a control voltage to the gap device to control its breakdown, and control means operable to vary the time phase relation of the control voltage relative to the voltage of the source.

ALFRED B. WHITE.